United States Patent
Jordan

(10) Patent No.: US 6,823,203 B2
(45) Date of Patent: Nov. 23, 2004

(54) SYSTEM AND METHOD FOR REMOVING SENSITIVE DATA FROM DIAGNOSTIC IMAGES

(75) Inventor: Sarah E. Jordan, Haverhill, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 96 days.

(21) Appl. No.: 09/876,747

(22) Filed: Jun. 7, 2001

(65) Prior Publication Data

US 2002/0188187 A1 Dec. 12, 2002

(51) Int. Cl.[7] ................................................ A61B 5/00
(52) U.S. Cl. .................... 600/407; 600/425; 382/283; 345/626; 128/920
(58) Field of Search ................................ 600/407, 410, 600/425, 437; 382/128, 131, 283; 345/581, 619, 626; 715/530, 540; 128/920, 922–925

(56) References Cited

U.S. PATENT DOCUMENTS

| | | | | |
|---|---|---|---|---|
| 5,412,702 A | * | 5/1995 | Sata | 378/4 |
| 5,737,100 A | | 4/1998 | Funada et al. | 358/501 |
| 5,865,745 A | * | 2/1999 | Schmitt et al. | 128/897 |
| 5,892,853 A | | 4/1999 | Hirani et al. | 382/280 |
| 5,930,404 A | * | 7/1999 | Hattori | 382/283 |
| 6,009,209 A | | 12/1999 | Acker et al. | 382/275 |
| 6,091,841 A | * | 7/2000 | Rogers et al. | 382/132 |
| 6,210,327 B1 | * | 4/2001 | Brackett et al. | 600/437 |
| 6,241,668 B1 | * | 6/2001 | Herzog | 600/407 |
| 6,260,021 B1 | * | 7/2001 | Wong et al. | 705/1 |
| 6,312,381 B1 | * | 11/2001 | Knell et al. | 600/437 |
| 6,352,511 B1 | * | 3/2002 | Hossack et al. | 600/443 |

FOREIGN PATENT DOCUMENTS

| | | | | |
|---|---|---|---|---|
| EP | 0962888 A2 | | 8/1999 | G06T/5/00 |
| GB | 0991005 A2 | * | 9/1999 | G06F/17/60 |

* cited by examiner

Primary Examiner—Ruth S. Smith
(74) Attorney, Agent, or Firm—John Vodopia

(57) ABSTRACT

The present disclosure relates to systems and methods for modifying medical diagnostic images. A method for removing sensitive data from one or more diagnostic images generally includes retrieving one or more images, identifying patient sensitive information, modifying the one or more images responsive to the step of identifying by obscuring the sensitive data, and exporting the modified diagnostic images to a storage device. The method may be implemented by an image enhancer capable of removing or masking sensitive data through a user interface, an input device, and an image editor. In response to an operator's inputs, the image editor may be apply one or more masks to obscure patient sensitive data from both still images and image loops in a variety of image display formats.

15 Claims, 10 Drawing Sheets

SYSTEM AND METHOD FOR REMOVING SENSITIVE DATA FROM DIAGNOSTIC IMAGES

FIELD OF THE INVENTION

The present disclosure relates to diagnostic image analysis. More particularly, systems and methods for diagnostic image management are disclosed.

BACKGROUND OF THE INVENTION

The human body is composed of tissues that are generally opaque. In the past, exploratory surgery was one common way to look inside the body. Today, doctors can use a vast array of imaging methods to obtain information about a patient. Some non-invasive imaging techniques include modalities such as X-ray, magnetic resonance imaging (MRI), computer-aided tomography (CAT), ultrasound, and so on. Each of these techniques has advantages that make it useful for observing certain medical conditions and parts of the body. The use of a specific test, or a combination of tests, depends upon the patient's symptoms and the disease being diagnosed.

Generally, a trained technician performs a number of tasks to record information required to diagnose one or more medical conditions using a diagnostic imaging system. The technician collects and may even edit portions of the recorded information to identify reference points in the anatomy. Regardless of the underlying image acquisition modality, the images may be recorded on videotape, fixed disk drives, or other data storage devices for later analysis by a physician.

For example, images acquired and recorded during an ultrasound exam may be exported to a networked storage device and saved for later evaluation. Because current image acquisition devices do not have the ability to remove patient information from the images prior to export, the possibility of a patient confidentiality breach exists each time diagnostic images are transferred across a network and/or stored in a network accessible data storage device.

To avoid a breach of confidentiality, patient information must be removed from the exported diagnostic images before these images can be used in presentations, training programs, and other such public demonstrations. Image manipulation after export is both error prone and labor intensive. In the case of long duration and/or high frame rate image loops, it may be necessary to remove patient information from each individual frame of the loop. Additionally, hard copy representations of diagnostic images must be partially defaced to protect sensitive patient information that appears on the hard copy media.

SUMMARY OF THE INVENTION

From the above, it will be appreciated that it is desirable to provide a system and method for selectively removing patient information from diagnostic images to protect patient confidentiality. It will be further appreciated that it is desirable to have a system and method that removes only patient specific identifiers from diagnostic images to enable the exported and recorded images to be used for educational purposes and/or public presentations. It will also be appreciated that a system and method capable of selectively removing patient information from diagnostic images prior to export from an image acquisition device will greatly reduce the chance that patient confidentiality could be compromised. In addition, removal of patient specific information can be accomplished more efficiently within an image management software application or within the image acquisition device than could be done after image export altogether.

Briefly described, in architecture, an image enhancer capable of removing or masking sensitive data can be implemented with a user interface, an input device, and an image editor. Using the image editor, a user may apply one or more masks to obscure sensitive data from both still images and image loops. In addition, the image enhancer can be configured to mask sensitive data in multiple image display formats.

A method for removing sensitive data from one or more images generally includes acquiring one or more diagnostic images, identifying sensitive information, modifying the appropriate images, and exporting the modified images to a data storage device.

Other features and advantages of the system and method for removing sensitive data will become apparent to one skilled in the art upon examination of the following drawings and detailed description. It is intended that all such additional features and advantages included herein are protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the invention. Moreover, in the drawings, like reference numerals designate corresponding parts throughout the several views.

DETAILED DESCRIPTION

A medical diagnostic image acquisition, reporting, and storage system is disclosed. The improved system selectively masks patient information from diagnostic images during image acquisition. Masking during image acquisition and prior to image transfer and/or storage via networked devices ensures that patient confidentiality is not compromised.

The improved system uses an image enhancer to permit a user of the system to selectively apply coverage masks over patient information on one or more diagnostic images that are to be viewed over networked computing devices. Various patient information masks are superimposed over patient identifiers to obscure sensitive information that has already been added to diagnostic images. Preferably, one or both image editing methodologies are applied prior to storage of exams that may be selected for training presentations or other public displays.

The improved medical diagnostic image acquisition, reporting, and storage system may be implemented by integrating the image enhancer with various image acquisition and computing devices. It should be appreciated that the image enhancer may be integrated with a number of image acquisition devices and is not limited to ultrasound devices alone. When associated with ultrasound image acquisition systems, some exemplary clinical applications may include imaging of the heart, coronary arteries, coronary flow reserve, blood perfusion, and tumor detection by analyzing blood supply to various organs throughout the body.

Figure 1:
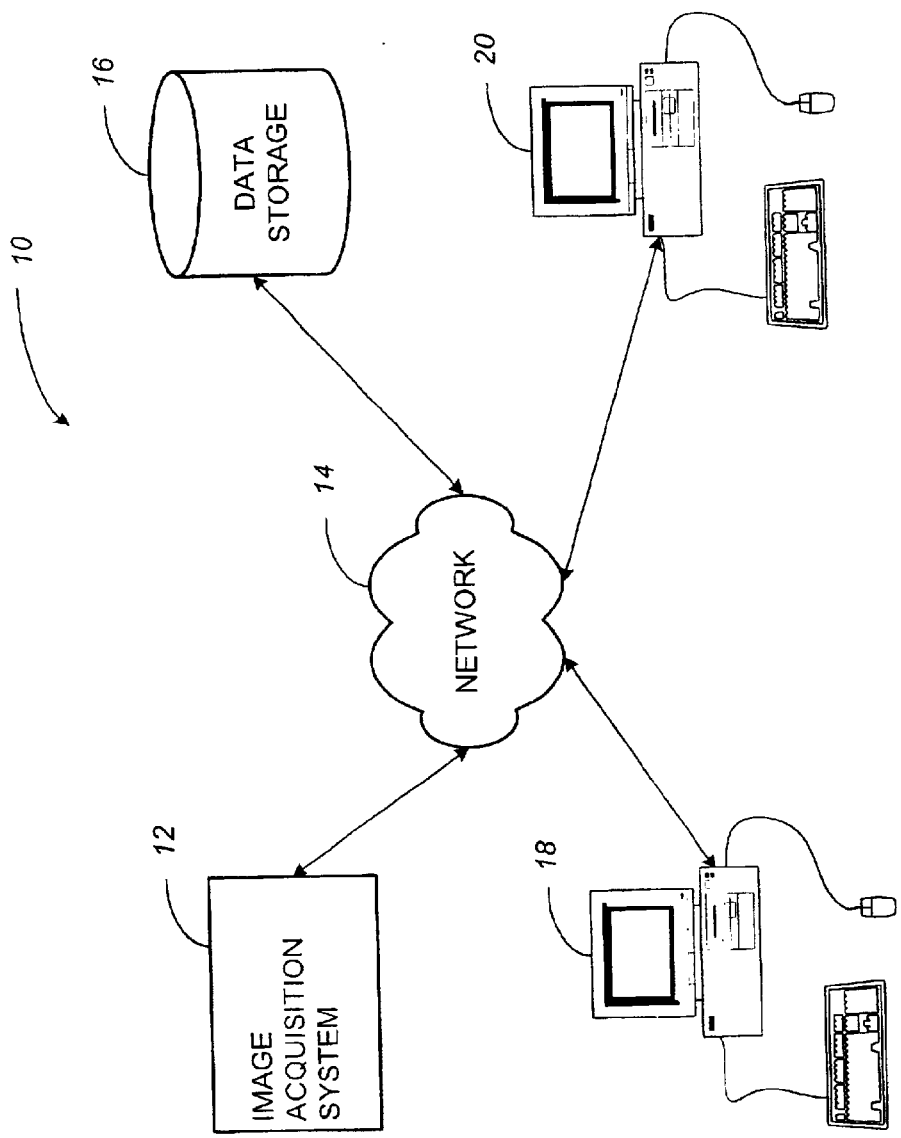
FIG. 1 is a schematic diagram of a medical diagnostic network environment suited to image acquisition, evaluation, and storage.

Referring now in more detail to the drawings, in which like numerals indicate corresponding parts throughout the several views, attention is now directed to FIG. 1, which illustrates a schematic diagram of a medical diagnostic network environment suited to image acquisition, evaluation, and storage. As illustrated in FIG. 1, the image acquisition, evaluation, and storage system is generally denoted by reference numeral 10 and may include an image acquisition system 12, a network 14, a data storage device 16, and one or more general purpose computers 18, 20.

The image acquisition, evaluation, and storage system (IAESS) 10 includes at least one image acquisition device connected to a network 14. The image acquisition device can be any electronic device capable of generating a diagnostic image. The network 14 can be any local area network (LAN) or wide area network (WAN). The IAESS 10 also includes a first computer 18 connected to the image acquisition system 12 either via the network 14 as shown, or alternatively via a direct interface connection (not shown). The first computer 18 may be configured with one or more automated reporting applications that permit a first physician to view one or more diagnostic images or image loops acquired by the image acquisition system 12. The IAESS 10 may also include a second computer 20 in communication with the network 14. The second computer 20 may be configured similarly to the first computer 18 to permit a second physician to view diagnostic images simultaneously with the first physician. As will be described in further detail with respect to FIGS. 4 and 5, each computing device 18, 20 within the IAESS 10 may be configured with an image enhancer that uses one or more input devices to selectively edit diagnostic images. It will be appreciated that the image enhancer may be integrated with the image acquisition system 12, in which case all of the functionality described herein is included in a single device.

Information can be exchanged over the network 14 using various communication protocols. For example, transmission control protocol/Internet protocol (TCP/IP) may be used if the network 14 is a wide area network such as the Internet. Proprietary image data communication protocols may also be operable across the network 14. It should be noted that although illustrated in FIG. 1 as connected through the network 14, the IAESS 10 is not dependent upon network connectivity.

Those skilled in the art will appreciate that various portions of the IAESS 10 can be implemented in hardware, software, firmware, or combinations thereof. In a preferred embodiment, the IAESS 10 is implemented using a combination of hardware and software or firmware that is stored in memory and executed by a suitable instruction execution system. If implemented solely in hardware, as in an alternative embodiment, the IAESS 10 can be implemented with any or a combination of the following technologies which are well known in the art: discrete logic circuits, application specific integrated circuits (ASICs), programmable gate arrays (PGAs), field programmable gate arrays (FPGAs), etc.

In the preferred embodiment, the image enhancer is implemented in software and executed by a special or general-purpose computer, such as a personal computer, workstation, minicomputer, or mainframe computer. It should be noted, however, that the image enhancer is not dependent upon the nature of the underlying computer in order to perform its function.

Figure 2:
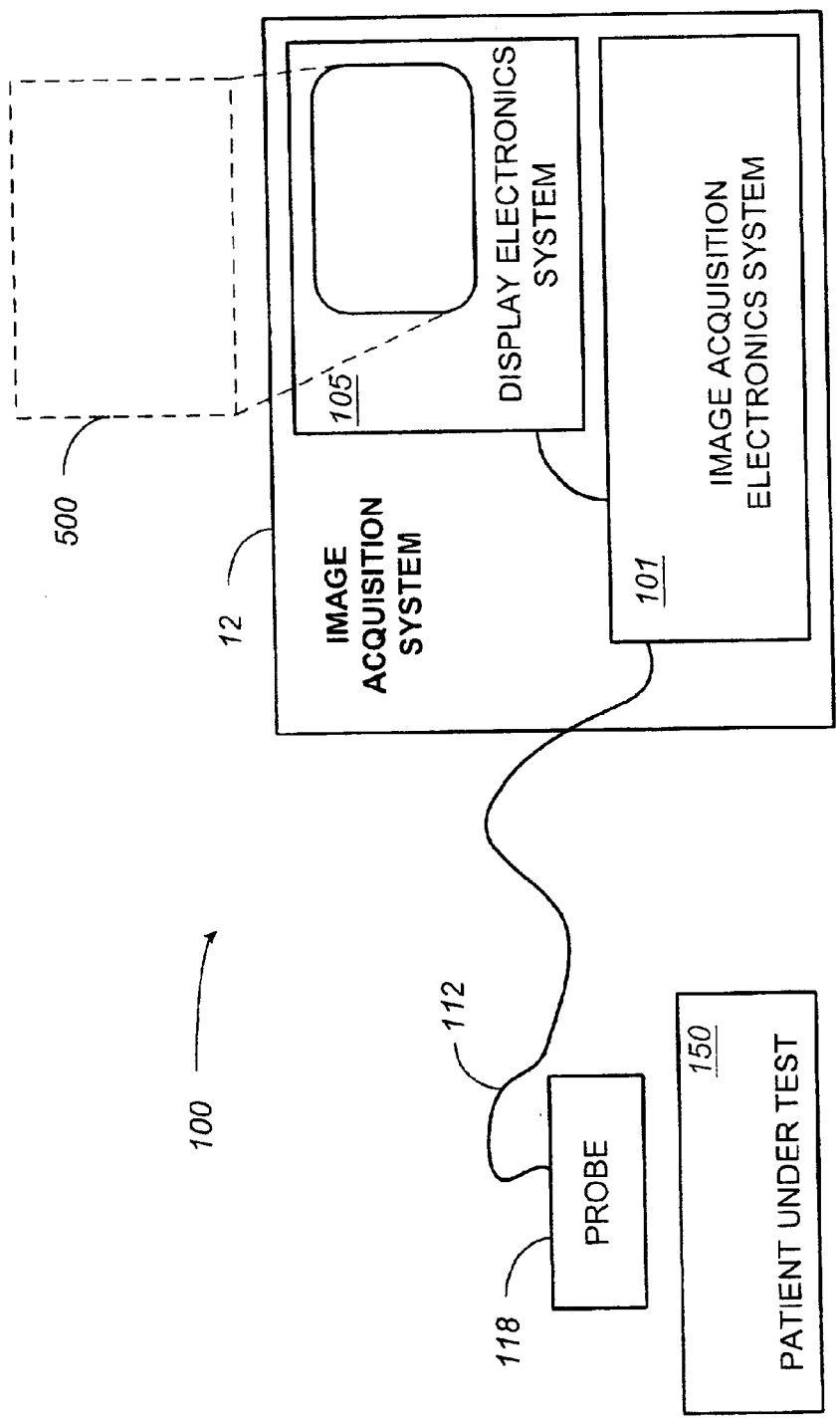
FIG. 2 is a schematic diagram further detailing the image acquisition system of FIG. 1.

Reference is now directed to FIG. 2, which represents a schematic diagram further detailing an exemplary image acquisition system of FIG. 1. In this regard, FIG. 2 is a schematic diagram of a medical diagnostic environment 100 that includes an image acquisition system 12, a patient under test 150, and a test probe 118 that communicates with the image acquisition system 12 via a probe interface conductor 112. The user/operator of the image acquisition system places the test probe 118 near a portion of the anatomy of the patient under test 150. In accordance with the underlying imaging modality, the image acquisition system 12 cooperates with the probe 118 to record one or more diagnostic images. As further illustrated in the diagram of FIG. 2, the image acquisition electronics system 101 and the display electronics system 105 produce an image 500 derived from the recorded electronic signals. It is important to note that some medical diagnostic imaging modalities do not use a probe to focus the underlying instrument on different structures of the body. For example, MRI systems do not use probes.

Figure 3:
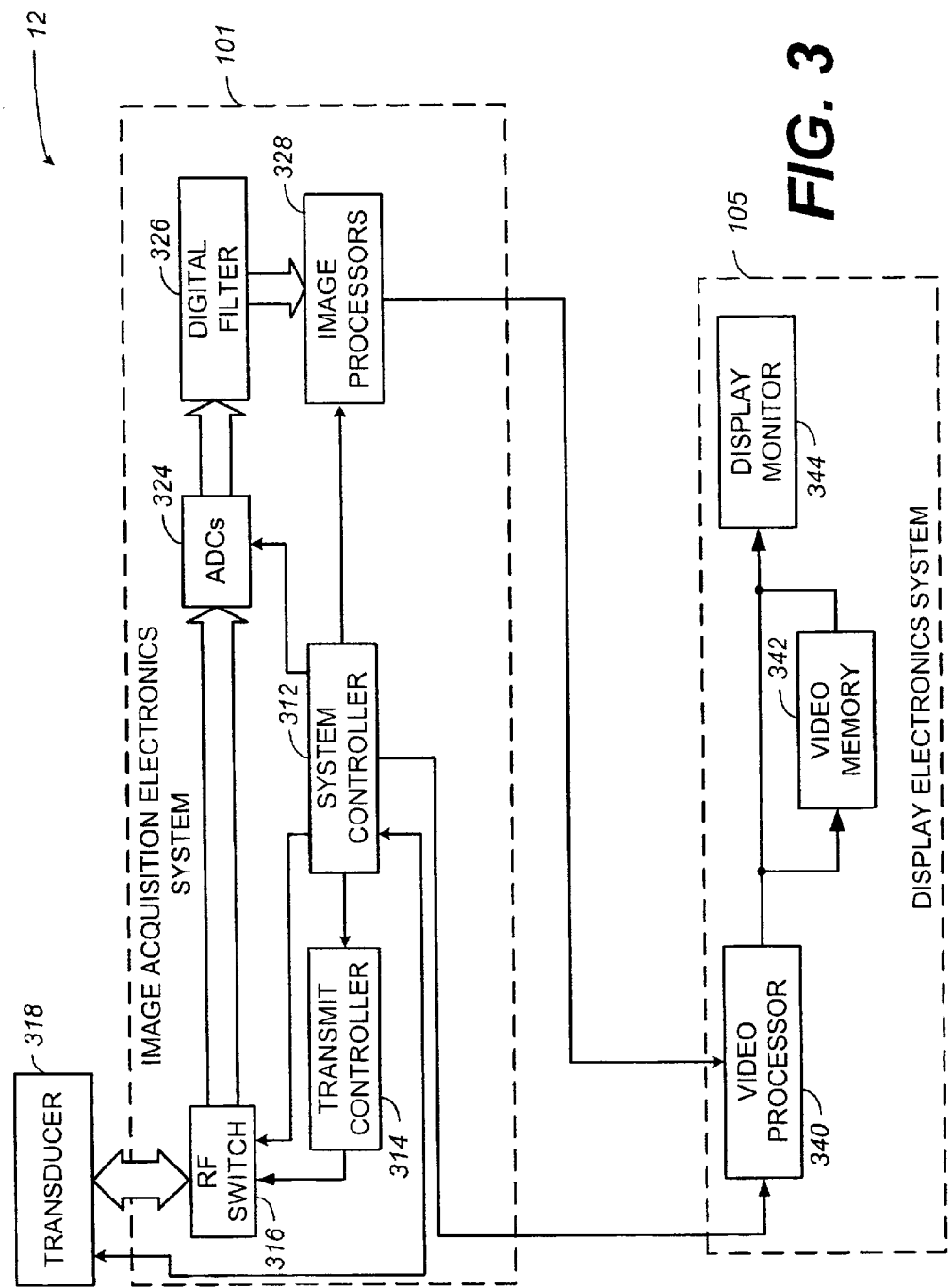
FIG. 3 is a functional block diagram illustrating image acquisition in an exemplary image acquisition system that can be applied in the medical diagnostic network environment of FIG. 1.

Reference is now directed to FIG. 3, which illustrates a functional block diagram of an exemplary image acquisition system 12 that may be integrated with the medical diagnostic network environment of FIG. 1. In this regard, the image acquisition system 12 may include an image acquisition electronics system 101 common to many ultrasound imaging systems. As shown in FIG. 3, the image acquisition electronics system 101 may be in communication with a transducer 318 and a display electronics system 105. The image acquisition electronics system 101 may include a system controller 312 that controls the operation and timing of the various elements and signal flow within the image acquisition system 12. The image acquisition electronics system 101 may also include a transmit controller 314, a radio-frequency (RF) switch 316, a plurality of analog to digital converters (ADCs) 324, a digital filter 326, and one or more image processors 328. As further illustrated in FIG. 3, the display electronics system 105 may contain a video processor 340, a video memory device 342, and a display monitor 344.

Figure 4:
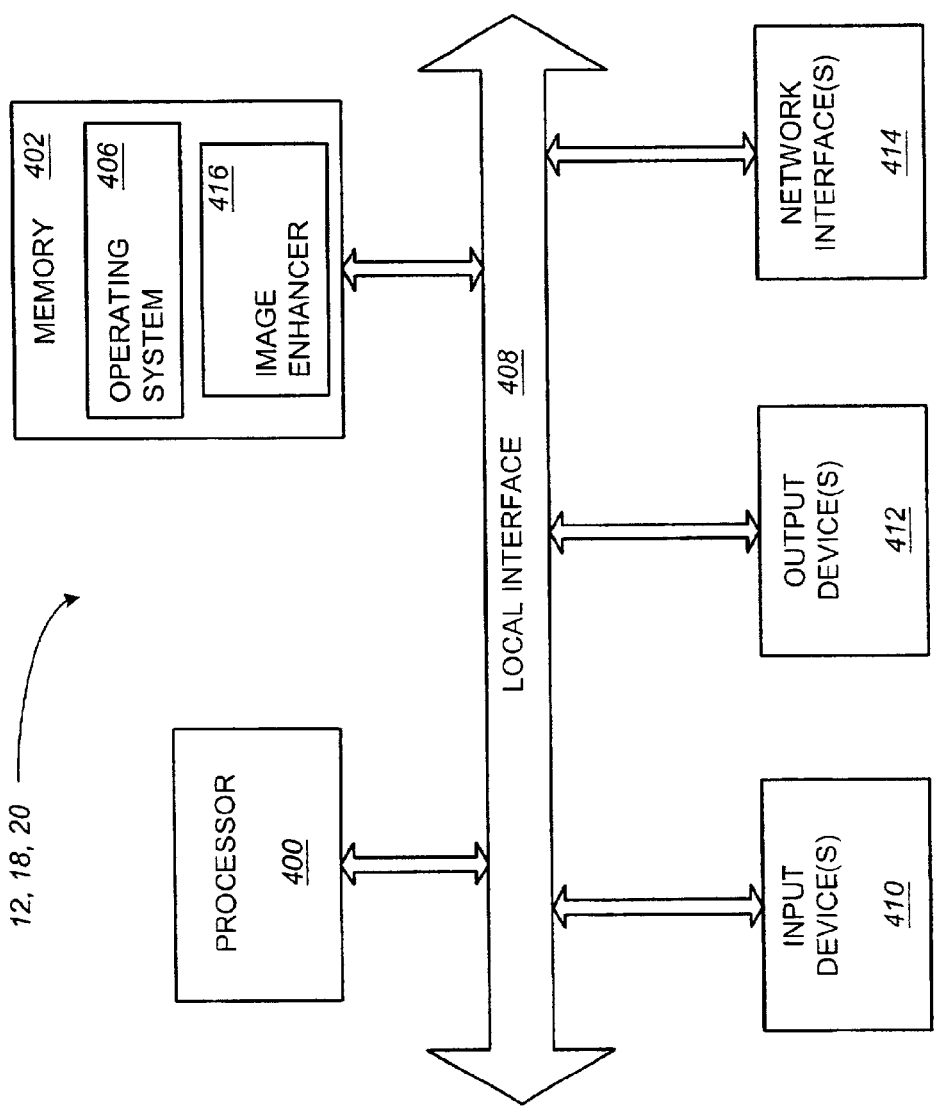
FIG. 4 is a functional block diagram of a general-purpose computer that may be operable on any of the three exemplary computing devices shown in the medical diagnostic network of FIG. 1.

Reference is now directed to FIG. 4, which illustrates a functional block diagram of a general-purpose computer that may be operable on any of the three exemplary devices (the image acquisition system 12, the first computer 18, and the second computer 20) shown in the medical diagnostic network of FIG. 1. In this regard, FIG. 4 illustrates that the devices may be configured to include an image enhancer 416.

Generally, computers and/or image acquisition systems that may include the image enhancer 416 can be general-purpose computers. The computers and/or image acquisition systems may include a processor 400, memory 402, input devices 410, output devices 412, and a network interface 414 that communicate with each other via a local interface 408. The local interface 408 can be, but is not limited to, one or more buses or other wired or wireless connections as is known in the art. The local interface 408 may have additional elements, such as buffers (caches), drivers, and controllers (omitted here for simplicity), to enable communications. Further, the local interface 408 includes address, control, and data connections to enable appropriate communications among the aforementioned components.

The processor 400 is a hardware device for executing software stored in memory 402. The processor 400 can be any custom made or commercially available processor, a central processing unit (CPU) or an auxiliary processor among several processors, and a microprocessor or macroprocessor.

The memory 402 can include any one or a combination of volatile memory elements, such as random access memory (RAM, DRAM, SDRAM, etc.), and non-volatile memory elements, such as read only memory (ROM), hard drive, tape, CDROM, etc. Moreover, the memory 402 may incorporate electronic, magnetic, optical, and/or other types of storage media.

The input devices 410 may include, but are not limited to, a scanner, microphone, keyboard, mouse or other interactive pointing device, voice activated interface, or other suitable operator machine interface. The input device can also take the form of an image acquisition device. Each of the various input devices 410 may be in communication with the processor 400 and/or the memory 402 via the local interface 408. It is significant to note that data received from an image acquisition device connected as an input device 410 or via the network interface 414 may take the form of diagnostic images that are stored in memory 402 as image files.

The output devices 412 may include a video interface that supplies a video output signal to a display monitor associated with the computer and/or image acquisition system. Display monitors associated with these devices can be conventional CRT based displays, liquid crystal displays (LCDs), plasma displays, or other display types. The output devices 412 may also include other well-known devices such as plotters, printers, and various film developers. It will be appreciated that a video signal may also be supplied to a number of storage devices, such as but not limited to, a videocassette recorder (VCR), a compact disc recorder, or similar devices to record a plurality of diagnostic images. It is significant to note that the local interface 408 may also be in communication with input/output devices that connect the computers and/or image acquisition devices to a network 14. These two-way communication devices include, but are not limited to, modulators/demodulators (modems), network cards, radio frequency (RF) or other transceivers, telephonic interfaces, bridges, and routers. For simplicity of illustration, such two-way communication devices are not shown.

The information stored in memory 402 may include one or more separate programs comprised of executable instructions for implementing logical functions. In the example of FIG. 4, the software in memory 402 includes the image enhancer 416 and a suitable operating system 406. A non-exhaustive list of commercially available operating systems includes Windows from Microsoft Corporation, Netware from Novell, and UNIX, which is available from many vendors. The operating system 406 controls the execution of other computer programs, such as the image enhancer 416, and provides scheduling, input/output control, file management, memory management, communication control, and other related services.

The processor 400 and operating system 406 define a computer platform, for which application programs, such as the image enhancer 416, may be written in higher level programming languages. It will be appreciated that each of the computers 18, 20 and the image acquisition device 12 may be configured to run a host of applications simultaneously using the aforementioned computer platform. It will be further appreciated that the software and/or firmware in memory 402 may also include a basic input output system (BIOS) (not shown). The BIOS is a set of essential software routines that test hardware at startup, launch the operating system 406, and support the transfer of data among hardware devices. The BIOS is stored in read-only memory and is executed when the computer and/or image acquisition device is activated.

When the computer and/or image acquisition device is in operation, the processor 400 executes software stored in memory 402, communicates data to and from memory 402, and generally controls operations of the underlying device pursuant to the software. The image enhancer 416, the operating system 406, and other applications are read in whole or in part by the processor 400, buffered by the processor 400, and executed.

The image enhancer 416 can be implemented in software, firmware, hardware, or a combination thereof. In the preferred embodiment, the image enhancer is implemented in software as an executable program and is performed by a general-purpose computer, such as a personal computer, workstation, minicomputer, or mainframe computer. Alternatively, the image enhancer 416 may be a source program, script, or any other entity containing a set of instructions to be performed. Furthermore, the image enhancer 416 can be written in an object oriented programming language, which has classes of data and methods, or in a procedure programming language, which has routines, subroutines, and/or functions. Examples of these languages include but are not limited to C, C++, Pascal, Basic, Fortran, Cobol, Perl, Java, and Ada. In the preferred embodiment, the image enhancer 416 is written in C++.

When the image enhancer 416 is implemented in software, as shown in FIG. 4, it should be noted that the image enhancer 416 can be stored on any computer readable medium for use by or in connection with any computer related system or method. In the context of this document, a computer readable medium is an electronic, magnetic, optical, or other physical device or means that can contain or store a computer program for use by, or in connection with a computer related system or method. The computer readable medium can be, for example but not limited to, an electronic, magnetic, optical, electromagnetic, infrared, or semiconductor system, apparatus, device, or propagation medium.

Image Enhancer Architecture and Operation

Figure 5:
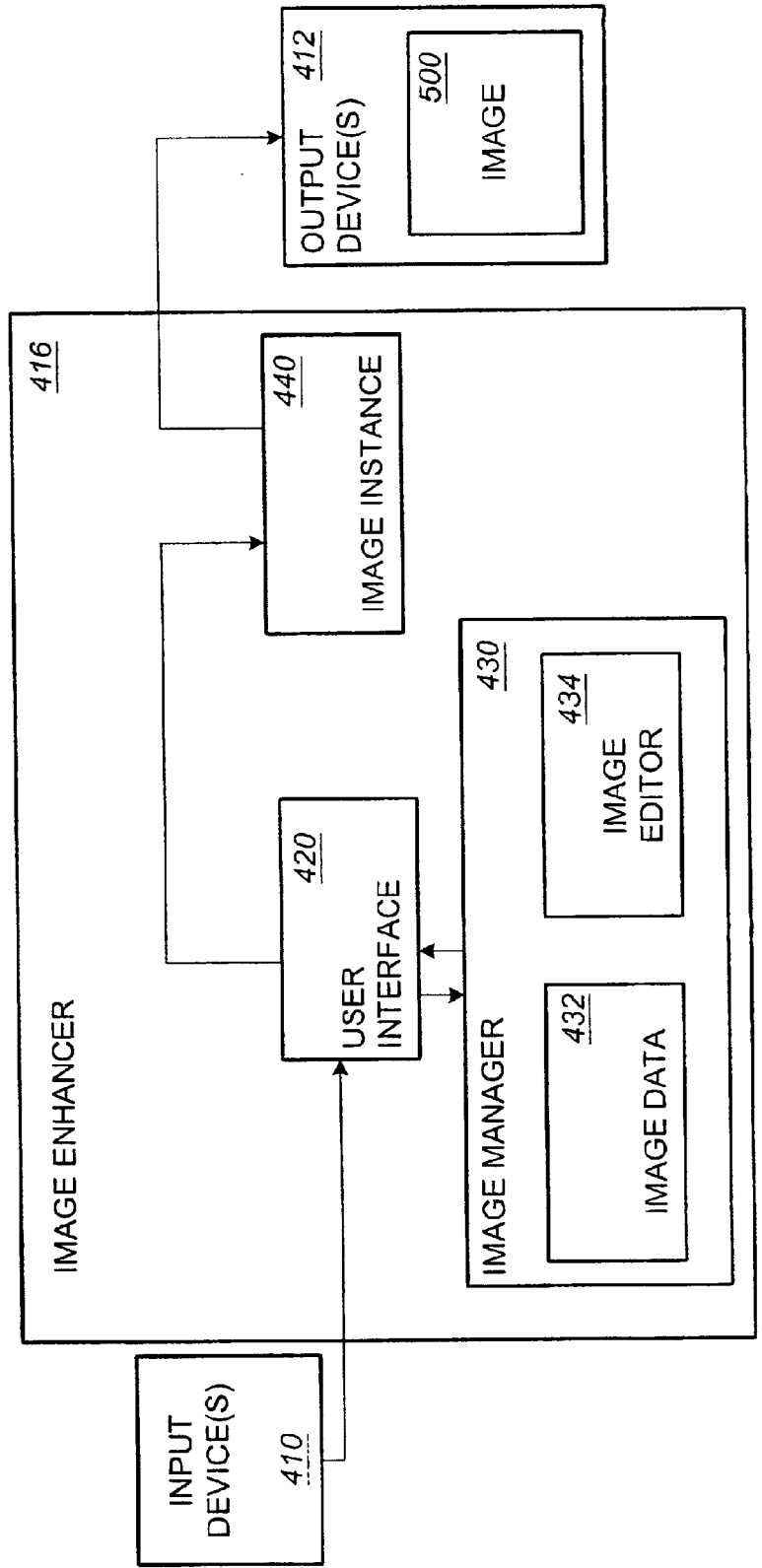
FIG. 5 is a functional block diagram illustrating the image enhancer of FIG. 4.

Reference is now directed to the functional block diagram of FIG. 5, which further illustrates the image enhancer 416 of FIG. 4. Shown here, the image enhancer 416 may include a user interface 420, an image manager 430, and an image instance 440.

The user interface 420 is in communication with one or more input devices 410, the image manager 430, and the image instance 440. The user interface 420 may consist of a plurality of data entry windows or frames that are presented to an operator of the image enhancer 416. In this regard, the user interface 420 may take the form of a graphical user interface (GUI) that is easily recognizable and operable by technicians and other users. For example, the user interface 420 may display application windows, a menu bar, and a command bar containing one or more file command push-buttons and one or more format command push-buttons. It is important to note that while the user interface 420 has been described in terms of data entry windows and frames, it could just as easily be implemented through voice activated commands or other human to system interfaces.

In an exemplary implementation, the user interface 420 displays a standard computer interface common to popular computer programs. Included therein may be several functional items as defined below:

Menu Bar—Contains one or more labels that activate drop down menus.

Drop Down Menu—Opens from the menu bar and remains active until an available menu option is selected or the menu is closed.

Pull Down Menu—A submenu typically activated by moving a pointing device over an expandable drop down menu option.

Context-Sensitive Menu—Displays options appropriate to the context in which the menu is called.

Pop-up Menu—Activated upon selection of a feature push-button.

Scroll Bar—Allows user to scroll left/right or up/down through a large window.

It should be appreciated by those skilled in the art that the image enhancer 416 is not limited to a particular implementation of the user interface 420.

The image manager 430 is in communication with image data 432 and an image editor 434 that are used to construct standardized displays of diagnostic images acquired by an image acquisition system 12 of FIG. 2. For example, a standardized display may contain a single image, a thumbnail display, or a composite of multiple related images. Furthermore, the image manager 430 and user interface 420 may work together to generate an image instance 440 that displays image data 432 in a number of different layouts and formats. These layouts and formats may be dictated by the underlying imaging modality used to acquire the diagnostic images (radiology, catheterization lab, etc.) or may be configured by the user.

The image manager 430 may also contain an image editor 434. An operator of the user interface 420 may use the image editor 434 in conjunction with various input devices 410 to add identifying information to the image data 432. This identifying information may include anatomical labels, acquisition information such as machine settings, data related to the subject, and so forth. The image editor 434 may also allow a user to selectively apply image masks as will be further explained in association with FIGS. 6C and 6D below.

Preferably, the image enhancer 416 is configured to interface with a plurality of output devices 412, which render or convert the image instance 440 into an operator observable image 500. For example, the image enhancer 416 may send an image instance 440 to a display monitor, which then converts the image into a format suitable for general viewing. Other output devices 412 may convert the image instance 440 into appropriate formats for storage, faxing, printing, electronic mailing, etc. It should be appreciated that once the image instance 440 is available in buffers associated with other applications, it is no longer dependent upon the image enhancer 416 and can be processed externally. Once an image has been stored on a networked device, its data and associated patient information may be available to operators with appropriate file access.

Figure 6A:
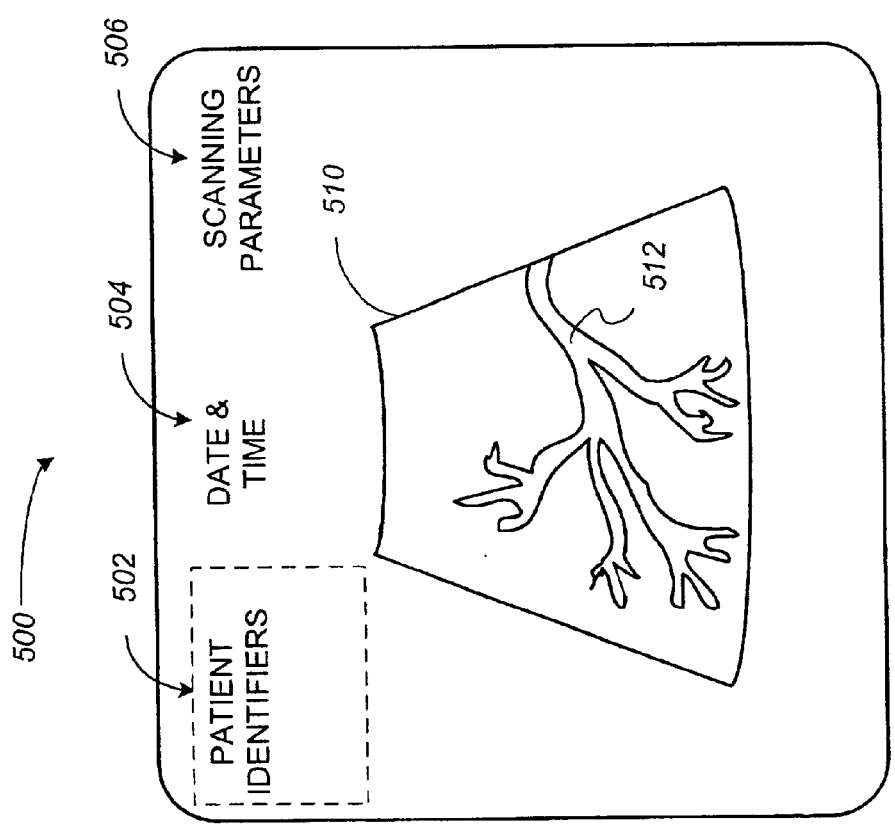
FIG. 6A is a schematic diagram of an exemplary image display that may be generated by the image acquisition system of FIG. 2.

The image enhancer 416 having been described with regard to the general-purpose computer of FIG. 4 and the functional block diagram of FIG. 5, reference is now directed to FIG. 6A, which illustrates an exemplary image display 500 that may be generated by the image acquisition system 12 of FIG. 2. In this regard, the exemplary image display 500 may contain alphanumeric information in the form of patient identifiers 502, date and time identifiers 504 and scanning parameters 506. In addition to the one or more alphanumeric identifiers, the image 500 may also include a diagnostic image 510 of an anatomical structure such as a portion of the circulatory system 512. The image 500 represents a snapshot of diagnostic image 510. Because the image enhancer 416 may be integrated into the image acquisition system, it will be appreciated that the diagnostic image 510 may comprise a loop of multiple images acquired over time. As such, each individual image or frame of the loop may contain the aforementioned alphanumeric information.

Figure 6B:
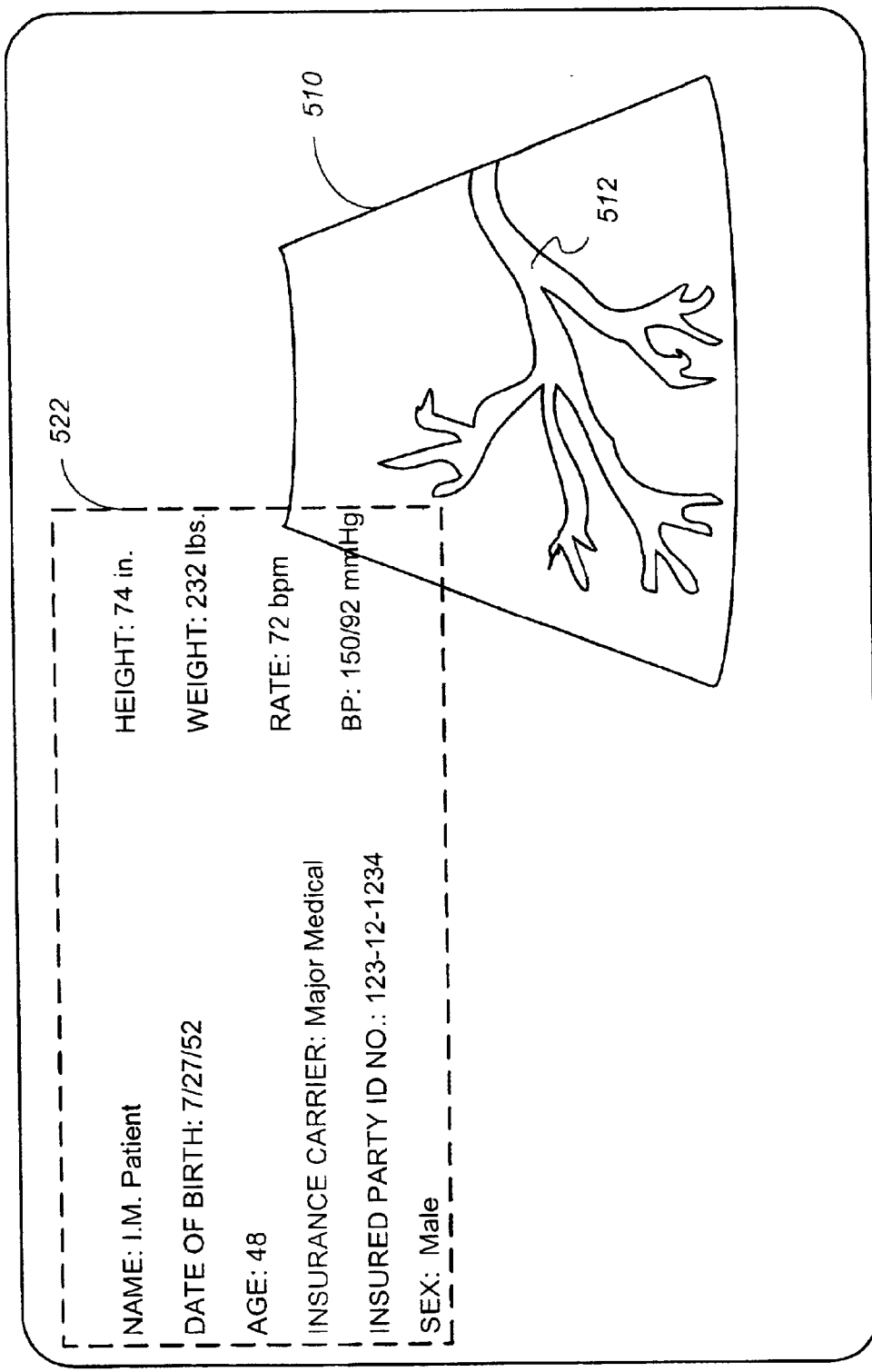
FIG. 6B is a schematic diagram of an exemplary image display that may be generated by the image acquisition system of FIG. 2 and may contain sensitive patient information.

Reference is now directed to FIG. 6B, which represents a schematic diagram of an exemplary image that may be generated by the image acquisition system 12 of FIG. 2 and may contain sensitive patient information. It will be appreciated that patient information in the form of a patient identifier overlay 522 together with the associated diagnostic image 510 may be transferred to an output device 412 and communicated to each of the computing devices in the medical diagnostic network of FIG. 1. The patient identifier overlay 522 may contain alphanumeric information identifying the subject of the diagnostic study, as well as other sensitive patient information.

As further illustrated in FIG. 6B, one or more of the patient identifiers included in the patient identifier overlay 522 may be undesirable on an image that is intended for training purposes or other public presentations. For example, the patient's name, insurance identification number (often a social security number), date of birth, and age may be deemed undesirable.

Figure 6C:
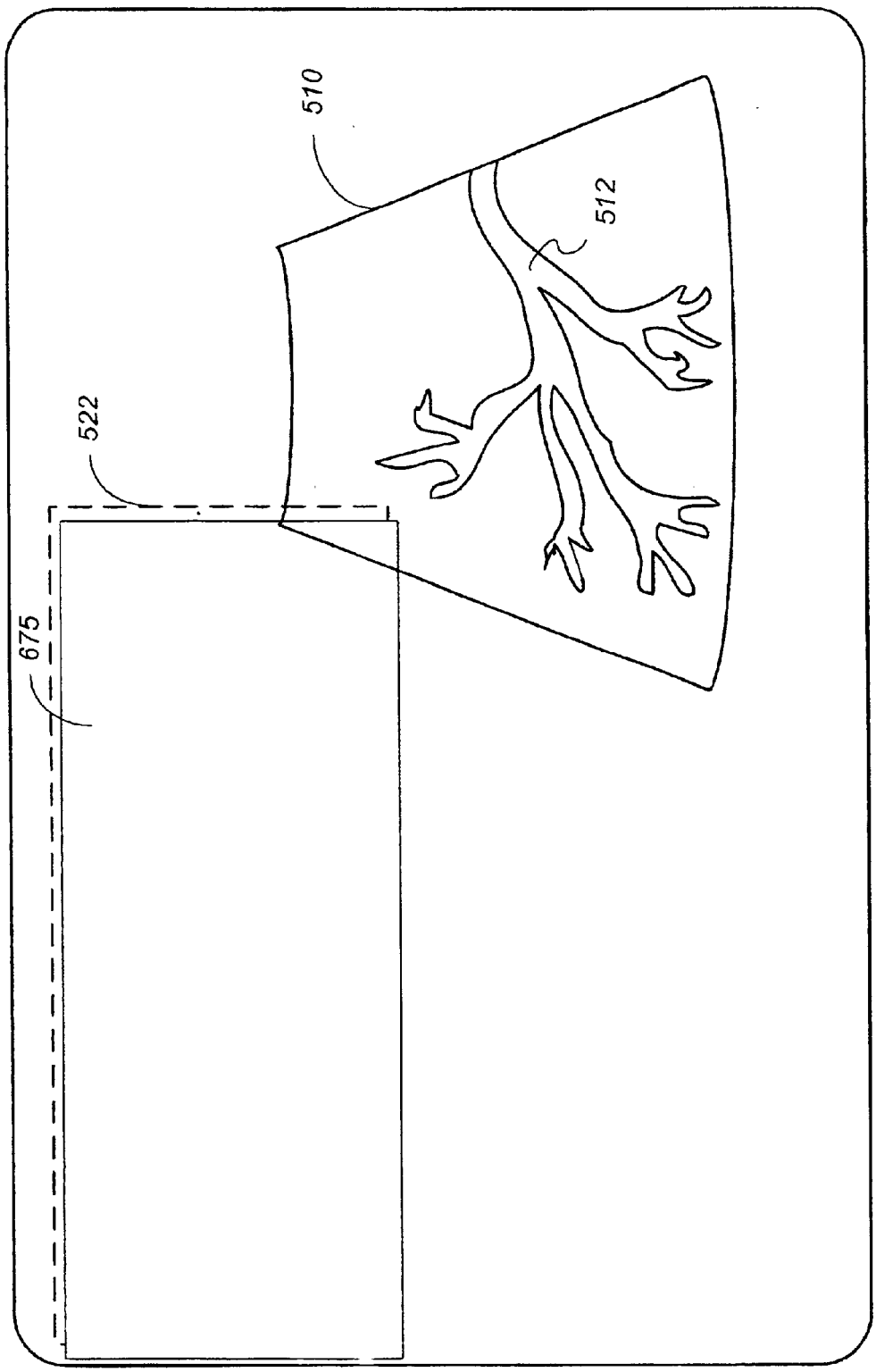
FIG. 6C is a schematic diagram of a patient information mask that may be applied by the image enhancer of FIG. 5 to the sensitive patient information of FIG. 6B.

In response, the image enhancer 416 may be configured to apply a mask as illustrated in FIG. 6C. The image enhancer 416 may provide a check button, menu option, or other method to apply a mask 675 over the entire patient identifier overlay 522. If the mask 675 is applied during image acquisition, an operator of the image enhancer 416 may prevent sensitive patient information from being permanently stored on a data storage device 16 associated with the network 14. Alternatively, an operator of the image enhancer 416 may apply the mask 675 to stored images before creating a training scenario or other public presentation.

Figure 6D:
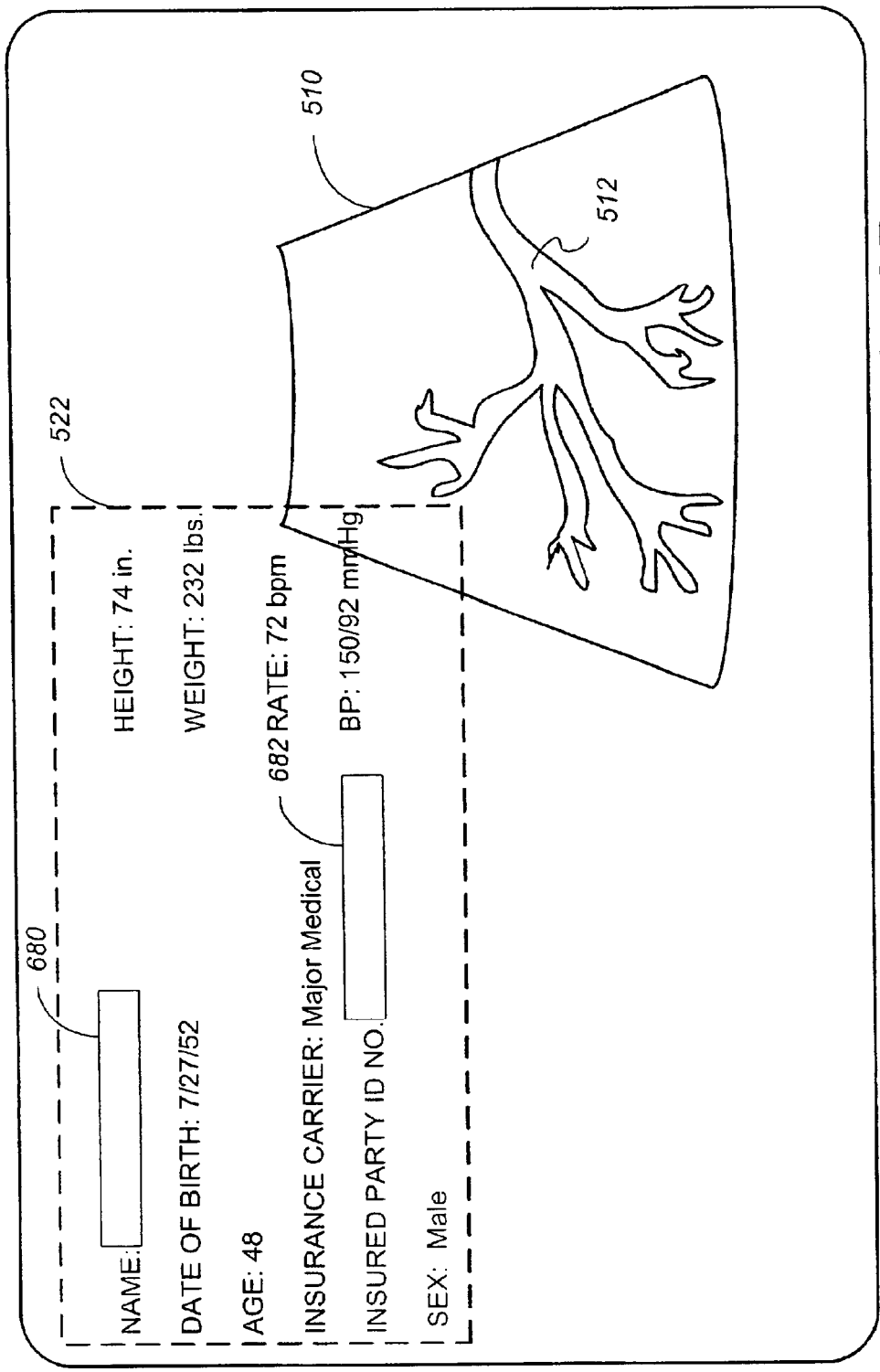
FIG. 6D is a schematic diagram illustrating a plurality of patient information masks that may be applied by the image enhancer of FIG. 5 to the sensitive patient information of FIG 6B.

In an alternative embodiment, the image enhancer 416 may be configured to apply a plurality of masks as illustrated in FIG. 6D. The image enhancer 416 may provide a number of check buttons, menu options, or other methods to apply masks 680, 682 over various portions of the patient identifier overlay 522. As illustrated in FIG. 6D, the image enhancer 416 may be configured to apply a "name" mask 680 sized to entirely obscure the patient name region of the image. Similarly, an "insured party identification number" mask 682 may be applied to obscure the insurance information as well.

The image enhancer 416 is intended for integration in a number of systems that display patient identifiers. Accordingly, the image enhancer 416 may allow an operator to selectively locate and resize patient identifier masks 680, 682. It should be appreciated that the image enhancer 416 may be configured to recognize and take advantage of editing efficiencies that are available with regard to different image display formats. For example, an imaging modality that commonly displays multiple images in a particular layout may require that one or more patient identifier masks is applied in the same location on each image. Once a user has applied a mask to a particular identifier on one image, the image enhancer 416 may be programmed to apply the same mask to each instance of this identifier on the remaining images. In addition, the image enhancer 416 may allow a user to apply one or more patient identifier masks to a single image of an image loop and copy this mask to all the remaining images in the loop.

Figure 7:
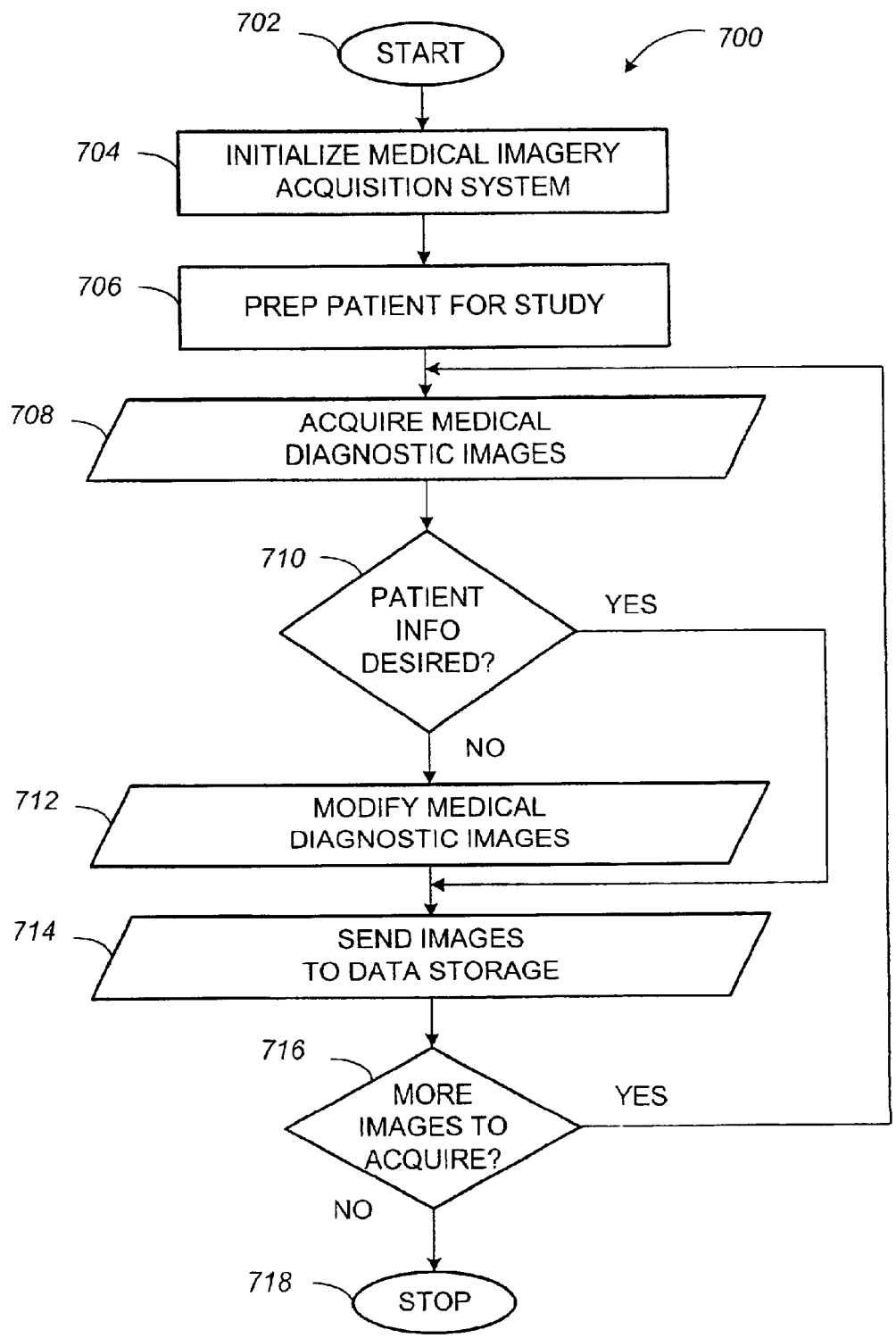
FIG. 7 is a flow chart illustrating a method employed by the image enhancer of FIG. 5 for removing sensitive patient information from one or more diagnostic images.

Reference is now directed to the flow chart of FIG. 7, which illustrates a method employed by the image enhancer 416 of FIG. 5 for removing sensitive patient information from one or more diagnostic images. The method 700 may begin with step 702 labeled, "START." First, the underlying image acquisition system may be initialized as indicated in step 704. Next, the technician performing the exam may prepare the patient as shown in step 706. In the case of an ultrasound exam, the technician, or other qualified individual may introduce one or more contrast agents into the patient's bloodstream or position an ultrasound transducer on the patient's chest wall.

In step 708, one or more diagnostic images may be acquired in accordance with the underlying medical study. It is significant to note that this step may include acquiring a plurality of image frames closely related in time to monitor the motion of various anatomical structures. For example, the technician may acquire an image loop showing several cycles of blood flow through the patient's heart. As illustrated in step 710, the operator or technician may then be queried to determine if patient information is desired on the underlying image frames prior to transfer across the network 14 and/or subsequent storage on a data storage device 16. It will be appreciated that this query may be performed via numerous interfaces as previously described. It will be further appreciated that the query may be performed at any time after initialization of the image acquisition system. It will be further appreciated that the method for removing sensitive data from one or more images 700 may be most effective if the response to the query is entered prior to transferring sensitive data across the network 14.

When the response to the query of step 710 indicates that patient information is desired on the stored images, the method for removing sensitive data from one or more images 700 may proceed to step 714 as indicated by the flow arrow labeled, "YES" that exits step 710. Otherwise, the method for removing sensitive data from one or more images 700 may proceed to step 712 where the one or more diagnostic images are modified to remove one or more patient identifiers.

At this point, the diagnostic images may be transferred across the network 14 either to the general-purpose computers 18, 20 or to one or more data storage devices 16. As indicated in step 716, the operator or technician may then be queried to determine if more diagnostic images are desired.

If the response to the query of step 716 indicates that more images are to be acquired, the method for removing sensitive data from one or more images 700 may proceed to step 708 as indicated by the flow arrow labeled, "YES" that exits step 716. It will be appreciated that the method for removing sensitive data from one or more images 700 may repeat steps 708 through 716 as desired. When the response to the query of step 716 is negative, the method for removing sensitive data from one or more images 700 terminates as illustrated in step 718 labeled, "STOP."

It is significant to note that process descriptions or blocks in the flow chart of FIG. 7 represent modules, segments, or portions of code which include one or more instructions for implementing specific steps in the method for removing sensitive data from one or more images 700. Alternate implementations are included within the scope of the preferred embodiment of the image enhancer 416 in which functions may be executed out of order from that shown or discussed, including concurrent execution or in reverse order, depending upon the functionality involved, as would be understood by those reasonably skilled in the art of the present invention. For example, as described above, it is contemplated that the various image-editing processes may be integrated within an image acquisition system, as well as within an image enhancer operable on post acquisition processing platforms.

It should be emphasized that the above embodiments of the image enhancer 416, particularly any preferred embodiments, are merely possible examples of implementations and are set forth for a clear understanding of the principles of the associated method for removing patient sensitive information from one or more diagnostic images 700. Variations and modifications may be made to the above embodiments of the image enhancer 416 without departing substantially from the spirit and principles thereof. All such modifications and variations are intended to be included within the scope of this disclosure and protected by the following claims.

What is claimed is:

1. A method for selectively removing data from one or more images in a computer based system, comprising:

acquiring at least one diagnostic image;

identifying patient information that is to be excluded from the at least one diagnostic image;

modifying the at least one diagnostic image responsive to the step of identifying, wherein identified patient information is excluded from the at least one diagnostic image by applying at least one mask to at least one patient identifier of the identified patient information in one of the diagnostic image and a plurality of frames comprising an image loop; and exporting the at least one modified diagnostic image over a data network.

2. The method of claim 1, wherein acquiring comprises performing a diagnostic examination in association with an image acquisition device.

3. The method of claim 1, wherein acquiring comprises retrieving a data file from a data storage device.

4. The method of claim 1, wherein identifying comprises selecting at least one patient identifier to be removed from the at least one diagnostic image.

5. The method of claim 1, wherein modifying comprises obscuring an area of the at least one diagnostic image.

6. A method for selectively removing data from one or more images in a computer based system, comprising:

acquiring at least one diagnostic image;

identifying patient information that is to be excluded from the at least one diagnostic image;

modifying the at least one diagnostic image responsive to the step of identifying, wherein identified patient information is excluded from the at least one diagnostic image by superimposing a plurality of masks over a respective instance of at least one patient identifier of the identified patient information in a multiple image display format; and exporting the at least one modified diagnostic image over a data network.

7. A computer based diagnostic image enhancement system, comprising:

means for retrieving a digital representation of at least one diagnostic image;

means for identifying at least one patient identifier reflective of the subject of an underlying diagnostic study that is not intended for association with the at least one diagnostic image; and means for selectively obscuring the at least one patient identifier responsive to the identifying means by applying at least one mask to the at least one patient identifier in one of the diagnostic image and a plurality of frames comprising an image loop.

8. The system of claim 7, wherein comprising:

means for communicating the at least one diagnostic image to at least one device on a network.

9. The system of claim 7, wherein the retrieving meant comprises a computer based diagnostic image acquisition system.

10. The system of claim 7, wherein the retrieving means comprises a computing device in association with a network.

11. The system of claim 7, wherein the identifying means comprises an image enhancer.

12. A computer based diagnostic image enhancement system, comprising:

means for retrieving a digital representation of at least one diagnostic image;

means for identifying at least one patient identifier reflective of the subject of an underlying diagnostic study that is not intended for association with the at least one diagnostic image; and means for selectively obscuring the at least one patient identifier responsive to the identifying means by superimposing a plurality of masks over a respective instance of the at least one patient identifier in a multiple image display format.

13. An interactive diagnostic image enhancer, comprising:

an image manager configured to receive a digital representation of a diagnostic image and at least one patient identifier; a user interface coupled to the image manager, operable to receive a plurality of commands from an operator via at least one input device, configured to identify at least one patient identification parameter that is not desired for association with the diagnostic image, wherein the user interface generates at least one command responsive to the identified patient parameter; and an image editor coupled to the image manager and the user interface, configured to receive the at least one command, wherein the image editor obscures the at least one patient parameter by applying at least one mask to the at least one patient identifier in one of the diagnostic image and a plurality of frames comprising an image loop.

14. An interactive diagnostic image enhancer, comprising:

an image manager configured to receive a digital representation of a diagnostic image and at least one patient identifier;

a user interface coupled to the image manager, operable to receive a plurality of commands from an operator via at least one input device, configured to identify at least one patient identification parameter that is not desired for association with the diagnostic image, wherein the user interface generates at least one command responsive to the identified patient parameter; and an image editor coupled to the image manager and the user interface, configured to receive the at least one command, wherein the image editor obscures the at least one patient parameter by superimposing a plurality of masks over a respective instance of the at least one patient identifier in a multiple image display format.

15. A computer readable medium having a computer program, comprising:

a first logic for identifying at least one patient identifier related to a patient that is the subject of a medical diagnostic exam;

a second logic for obtaining an input reflective of an operator's desire whether to associate the at least one patient identifier with at least one image acquired during the medical diagnostic exam; and a third logic for generating the at least one image with the at least one patient identifier obscured in response to the second logic by applying at least one mask to the at least one patient identifier in a plurality of frames comprising an image loop.

* * * * *